INVENTOR.
SAMUEL W. LASWELL
BY Prosser & Prosser
ATTORNEYS 3,396,761
METHOD AND APPARATUS FOR PRODUCING A RETICULATED WIRE STRUCTURE
Samuel W. Laswell, Toledo, Ohio, assignor to Sheller-Globe Corporation, a corporation of Ohio
Filed Mar. 18, 1966, Ser. No. 535,529
5 Claims. (Cl. 140—112)

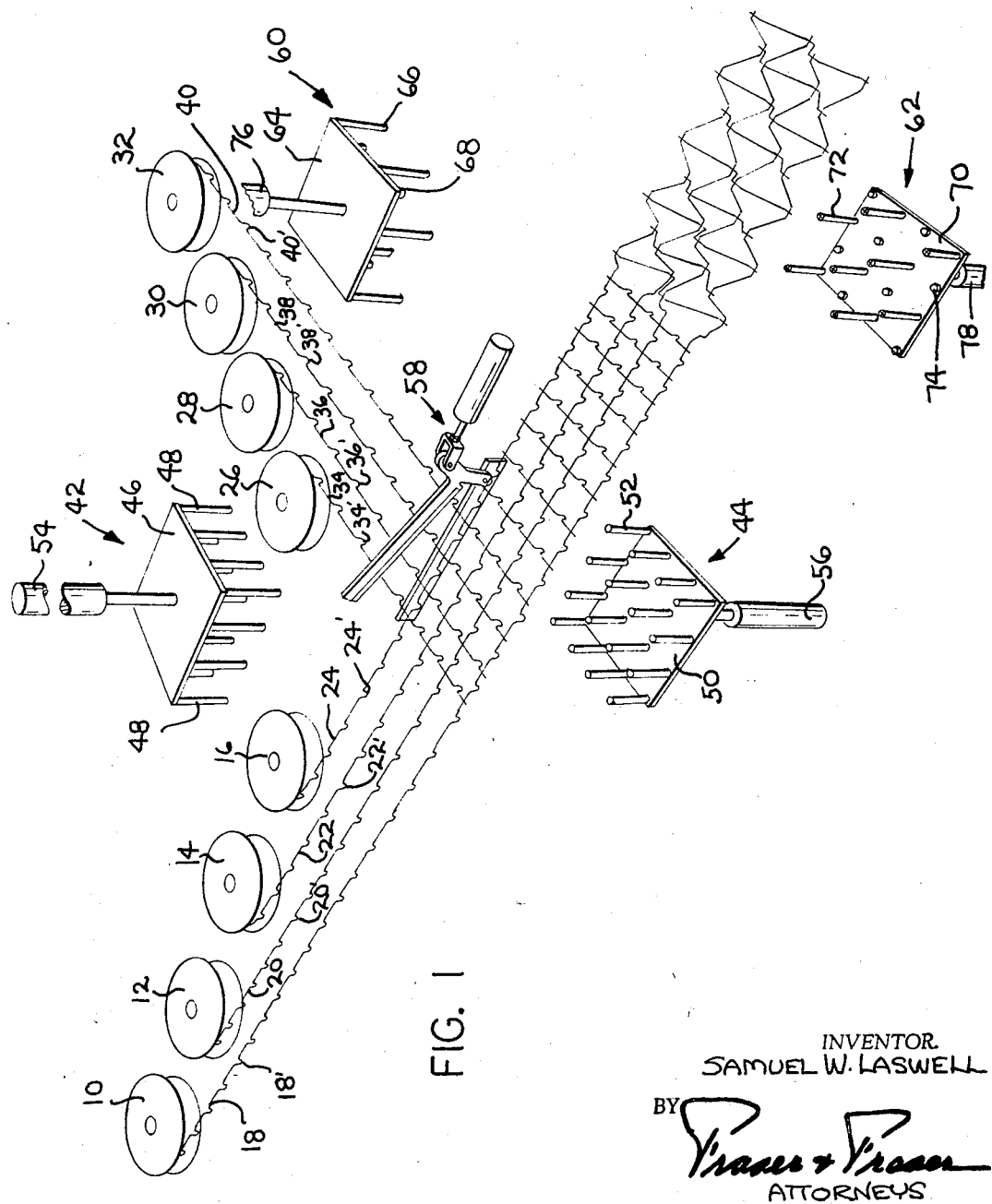
FIG. 1
INVENTOR
SAMUEL W. LASWELL
ATTORNEYS

The present invention relates to a method and apparatus for producing a reticulated wire structure.

It is an object of the present invention to provide a method and apparatus for producing a reticulated wire structure of improved strength-to-weight ratio characteristics.

It is another object of the invention to provide a method and apparatus for producing a reticulated wire structure able to withstand substantial torsional, shear, compressional, and tension loading.

Still a further object of the invention is to provide a method and apparatus for producing a reticulated wire structure which can experience a wide range of temperature without an adverse effect on the over-all dimensional characteristics thereof.

A further object of the invention is the economic and rapid production of a reticulated wire structure.

The other objects of the invention may be achieved by feeding a first set of parallel spaced wires along respective parallel spaced paths, the wires of the first set having substantially equally spaced apart corrugations; feeding a second set of parallel spaced wires along respective parallel spaced paths wherein the paths are substantially transverse to the paths of the first set of wires, the wires of the second set having substantially equally spaced apart corrugations; causing a portion of the wires of the second set to cross over the wires of the first set; welding the wires of the first and second sets together at the cross-over points; and applying opposed forces to transversely alternate cross-over points to straighten the wires while maintaining a fixed distance between adjacent cross-over points.

Other objects and advantages of the invention will become more readily apparent to one skilled in the art by reading the following detailed description of an embodiment of the invention when considered in the light of the accompanying drawings, in which:

FIGURE 1 is a diagrammatic perspective view of the apparatus employed for carrying out the method of the invention for producing the reticulated wire structure;

Figure 2:
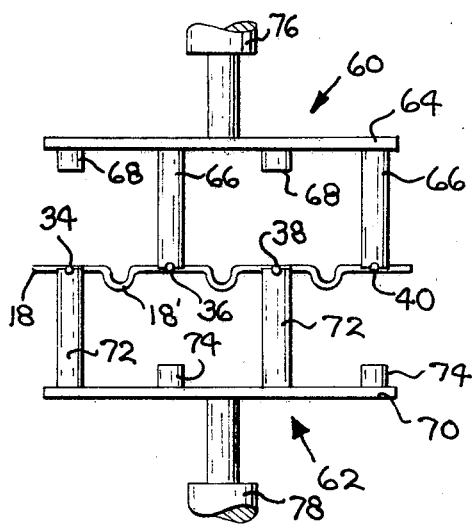
FIGURE 2 is a fragmentary elevational view of the mechanism for applying opposing forces to the welded reticulated wire structure to form the same into a three dimensional structure.

With reference to FIGURE 1, there is shown a system for accomplishing the method of the invention. A plurality of spools 10, 12, 14, 16 are disposed to feed wires 18, 20, 22, and 24 respectively along parallel spaced paths. Each of the wires is provided with a series of spaced corrugations 18′, 20′, 22′, 24′ respectively. The corrugations are substantially equidistantly spaced and for the best results are substantially aligned with one another during their longitudinal travel along their respective paths. Suitable means for accurately guiding the wires along their paths may be employed, but are not considered absolutely necessary nor are such means an integral part of the invention.

A second set of spools 26, 28, 30, 32 are disposed to feed wires 34, 36, 38, and 40 respectively along parallel spaced paths which are substantially transverse to the paths of the wires 18, 20, 22, and 24. Each of the wires is provided with a series of spaced corrugation 34′, 36′, 38′, 40′, respectively. These wires are then fed to crossover or overlap the first mentioned set of wires in the approximate relationship illustrated in FIGURE 1. It will be noted that in this position the cross-over points of the wires occur at points intermediate the adjacent corrugations of the respective wires.

At this point in the operation of the system, the wires are satisfactorily maintained in their relative positions while a welding mechanism is brought into contact with the wires to effectively weld the wires at the cross-over points. More specifically, the welding mechanism may typically be comprised of a pair of cooperating members 42 and 44. The member 42 includes a plate-like element 46 having a plurality of electrodes 48 depending therefrom. The member 44 is similar in structure to the member 42 and includes a plate-like member 50 having a plurality of electrodes 52 projecting upwardly therefrom. The electrodes 48 and 52 of the respective members 42 and 44 are suitably connected to a source of electrical potential, not illustrated. The members 42 and 44 are adapted for movement toward and away from the wire assembly by any suitable means such as for example pressure fluid actuated cylinder means 54 and 56, respectively.

It will be appreciated that in order to effect the desired welding operation, the members 42 and 44 are caused to move toward the wire assembly until their respective electrode elements contact the cross-over points of wires. In the event the wires of the second set are disposed in juxtaposition above the wires of the first set, the electrodes 48 of the upper member 42 will initially contact the wires of the second set while the electrodes 52 of the lower member 44 will contact the wires of the first set. The electrodes are then maintained in this position while the electrodes are suitably energized causing the wires to be welded together.

Upon completion of the welding operation, the elements 42 and 44 are withdrawn by the cylinders 54 and 56 and the wires of the second set are severed by a hydraulically actuated shear mechanism generally indicated by reference numeral 58. It will be clearly apparent to those skilled in the art that many different types of shearing mechanisms may be satisfactorily employed to accomplish this shearing operation.

The above operation may be continued in the above described sequence by simply feeding the wires of the first set, indexing the wires of the second set; welding the overlapping wires at the cross-over points; shearing or cutting the wires of the second set; and moving the entire assembly downwardly away from the feed spools 10, 12, 14, 16 of the first set. The material so made is relatively planar in construction and may be cut to any desired length and suitably stored. Alternatively, in a production run the subsequent operations may be effected to form the structure into a three dimensional structure and this may then be cut into any desired lengths. The structure made or produced may be formed in a three dimensional structure by suitable cooperating forming fixtures 60 and 62.

The upper fixture 60 includes a plate-like member 64 having two sets of downwardly extending fingers 66 and 68. As is clearly apparent in FIGURES 2 and 3, the fingers 66 are considerably longer than the fingers 68. The fingers 66 and 68 are adapted to contact adjacent cross-over points of the wires of the welded wire assembly and to assist in the proper alignment of the wires with respect to the fingers. Each of the fingers is contoured with appropriate cavities to receive the wires. In effect, the free ends of the fingers are provided with a pair of channels formed at right angles with respect to one another.

The lower fixture 62 includes a plate-like member 70 having two sets of upwardly extending fingers 72 and 74 alternately spaced on the upper surface thereof. If will be noted that the fingers 72 are longer than the fingers 74. The free ends of the fingers 72 and 74 are provided with contoured upper surfaces in the same fashion as the free ends of the fingers 66 and 68 of the upper fixture 60.

The upper and lower cooperating forming fixtures 60 and 62 are adapted for movement toward and away from the wire assembly by any suitable means, such as for example, pressure fluid actuated cylinder means 76 and 78, respectively. It will be appreciated that other means may be employed for effecting the desired movement of the cooperating forming fixtures.

Figure 3:
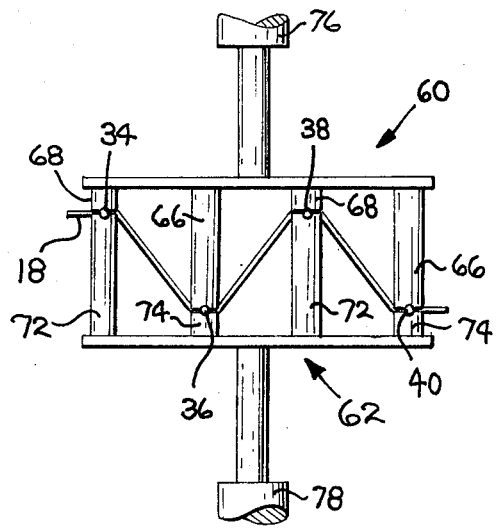
FIGURE 3 is a fragmentary elevational view of the mechanism illustrated in FIGURE 2 with the parts thereof in the position subsequent to the forming of the wire structure.

In operation, the cooperating forming fixtures 60 and 62 are moved toward one another to the position illustrated in FIGURE 2 where the longer fingers 66 and 72 on the upper and lower fixtures, respectively contact the aligned cross-over points of the welded wire assembly. Then the upper and lower forming fixtures 60 and 62 are moved to the position illustrated in FIGURE 3 wherein the longer fingers of the upper forming fixtures are caused to contact the shorter fingers 74 of the lower forming fixture; and the longer fingers 72 of the upper forming fixture contact the shorter fingers 68 of the lower forming fixture. Clearly, the above mentioned contact of the finger members limits the inward movement of the cooperating forming fixtures. During the movement between the positon shown in FIGURES 2 and 3 the corrugated portions of the wires are straightened and the metal of the wire elements, between the welded cross-over points, is stretched beyond its point of elasticity thereby becoming straightened to the shape illustrated in FIGURE 3. From a structural standpoint, the stretching and subsequent straightening of the wires between the welded cross-over points is important in imparting to the structure the desired mechanical and structural strength characteristics. Further, it will be noted that during the last mentioned forming operation, the transverse spacing between adjacent cross-over points remains constant thereby simplifying the construction of the forming fixture.

Figure 4:
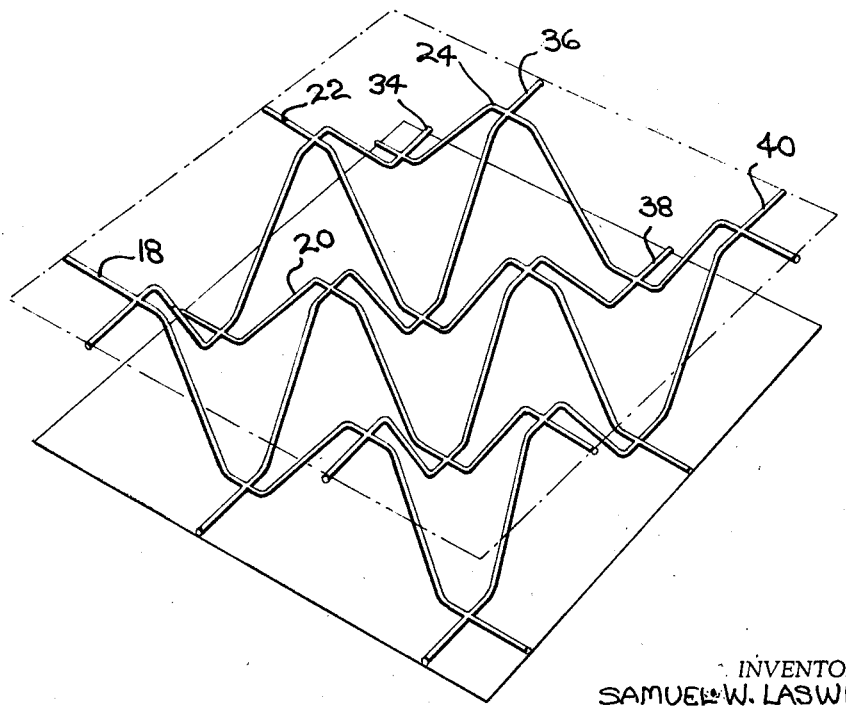
FIGURE 4 is an enlarged fragmentary perspective view of the completed reticulated wire structure.

Through the cooperative action of the forming fixtures 60 and 62, the substantially planar welded wire assembly is formed into a three dimensional structure. The resultant reticulated three dimensional wire structure is illustrated in FIGURE 4.

In the preferred embodiment of the invention, the portions of the wires immediately adjacent the cross-over points are formed to be relatively flat to provide a surface for subsequent attachment to a load bearing surface such as the floor of a truck, mobile home, or the like. In FIGURE 4 such load bearing surface is shown diagrammatically in dotted lines.

While throughout the description of the invention, the corrugations in the wires have been described as being in a vertical plane, it will be understood that they could likewise be disposed in a horizontal plane.

It will be understood by those skilled in the art that the wires illustrated and described throughout the above description could be replaced by thin walled tubing for example, with the desired objectives being likewise obtained.

The purpose of providing the corrugations in the wires utilized in the aforedescribed method is to afford sufficient length of wire to effect a substantial depth of cross-section in the finished three dimensional reticulated wire structure.

In accordance with the provisions of the patent statutes I have explained the principle and mode of operation of my invention and have illustrated and described what I now consider to represent its best embodiment. However, I desire to have it understood that within the scope of the appended claims, the invention may be practiced otherwise than as specifically illustrated and described.

What I claim is:

1. A method of producing a three dimensional reticulated wire structure comprising:

feeding a first set of parallel spaced wires along respective parallel spaced paths, the wires of said first set having substantially equally spaced apart corrugations;

feeding a second set of parallel spaced wires along respective parallel spaced paths wherein said paths are substantially transversed to the paths of said first set of wires, the wires of said second set having substantially equally spaced apart corrugations;

causing a portion of the wires of said second set to cross over the wires of said first set;

welding the wires of said first and second sets together at the cross-over points; and applying opposed forces to transverse alternate cross-over points, said forces being sufficient to straighten the corrugations in the wires of the first and second sets, while maintaining a fixed distance between adjacent cross-over points.

2. The method claimed in claim 1 wherein the wires of said first and second sets are substantially in the same plane.

3. The method claimed in claim 1 including an additional step of cutting the wires of said second set prior to welding the wires of said first and second sets together at the cross-over points.

4. The method claimed in claim 1 wherein said welding resistance welding.

5. The method claimed in claim 1 wherein the wires immediately adjacent the cross-over points are substantially flat.

References Cited

UNITED STATES PATENTS 3,298,402   1/1967   Hale _____ 140—112

CHARLES W. LANHAM, *Primary Examiner.*

L. A. LARSON, *Assistant Examiner.*